United States Patent [19]

Barents et al.

[11] 4,278,700
[45] Jul. 14, 1981

[54] MARZIPAN SUBSTITUTE

[75] Inventors: Roelof H. Barents, Poortugaal, Netherlands; John B. Rossell, Loughton, England

[73] Assignee: Lever Brothers Company, New York, N.Y.

[21] Appl. No.: 98,582

[22] Filed: Nov. 29, 1979

[30] Foreign Application Priority Data

Dec. 1, 1978 [GB] United Kingdom ............... 46910/78

[51] Int. Cl.$^3$ .............................................. A23G 3/00
[52] U.S. Cl. ...................................... 426/660; 426/613
[58] Field of Search ............... 426/660, 613, 629, 639, 426/656, 104

[56] References Cited

U.S. PATENT DOCUMENTS

| | | | |
|---|---|---|---|
| 2,627,465 | 2/1953 | Pettibone | 426/660 |
| 2,694,644 | 11/1954 | Knab | 426/660 |
| 3,998,976 | 12/1976 | Pernod | 426/660 |

OTHER PUBLICATIONS

Shuse's Complete Confectioner 13th ed., Bush & Co. Ltd., Ash Grove Works, Hackney, London, Eng., 1957, pp. 263–268.

Primary Examiner—Jeanette M. Hunter
Attorney, Agent, or Firm—Melvin H. Kurtz

[57] ABSTRACT

Candy bars and other chocolate-coated confectionery is resistant to blooming on storage when filled with a substitute marzipan composition, the glyceride content of which comprises an edible vegetable fat having a dilatation at 20° C. of at least 800, preferably 1000 and at 35° C. of at most 500, preferably 400 and more particularly not more than 200. Preferably the fat is a hard butter, or itself a couverture fat, which may be present in a similar amount to a protein base provided by meal or other comminuted almond substances, particularly soyabean meal. The composition may also be in the form of a free-flowing powder to which it is necessary only to add water for conversion to a plastic mass suitable for piping, filling and the like in confectionery.

9 Claims, No Drawings

MARZIPAN SUBSTITUTE

GENERAL DESCRIPTION OF THE INVENTION

Almond paste, marzipan and its substitutes are widely used in confectionery for coating, filling and decorative purposes, in a plastic extrudable condition in which it may be piped or spread in use. All contain varying but in all cases substantial amounts of sugar and this may be cooked in their preparation with the other ingredients which always comprise a fat-bearing protein source; all of which constitutents are apparently necessary to confer the degree of plasticity required in these products. When coated with chocolate in the preparation of candy bars and other confectionery however they promote bloom in the couverture during storage. The effect has been attributed to incompatibility of the particular glycerides accompanying the protein base, with those of the couverture.

In order to obviate this effect, which while entirely harmless to the consumer nevertheless seriously detracts from the customer appeal of these confectionery products, there is proposed by the present invention to provide for at least part of the fat present in the filling mass in the form of a fat, the glyceride composition of which is compatible with couverture fats.

PRIOR ART

According to The New International Confectioner (W J Fance, 2nd Edition, New impression 1976) page 210, marzipan contains two parts almonds and one part sugar, ground together and cooked and known as raw marzipan. Almond paste or almond icing should contain one part almonds and two parts sugar according to this reference, together with sufficient egg or glucose to make it a pliable paste. Equal parts of marzipan and sugar make an alternative recipe. Comminuted hazelnuts may be used instead of almonds in the preparation of gianduja, pralines and nougats containing couvertures in addition to sugar (ibid. pages 213–5). It has not however been proposed to use other drupes instead of almonds in such formulations. Marzipan substitutes containing inter alia other drupes such as apricot kernels or peanuts and also soyaflour have been proposed (Food Industries Manual, London 1947, pages 271 and 272).

German Patent Specification No. 2,712,269 discloses for example a low-calory marzipan in which soya protein is added as part of the composition. German published Patent Specification Nos. 2,720,691 and 2,720,692 disclose soyabean substitutes containing edible oils in addition to sugar and soyabean meal. Other references to the use of soya protein include Confectionery Production, Vol. 40 (8) pages 339–340 and 345 (1974) and 41 (12) pages 580–582 and 594 (1975) and FSTA 5 (1973) No. 6 "Use of Soyabeans for Production of Confectionery". A filling mass containing soyabean protein and pregelatinised starch in specified proportions is described in British Patent No. 1,395,884.

The present invention relates to edible compositions suitable for use as an alternative to marzipan and in particular to such a composition in the form of a free-flowing powder which converts to a marzipan substitute by the addition of water.

Marzipan is a cooked mixture of ground almonds and sugar, sometimes known as almond paste where extra sugar is added. It is very expensive owing to the high cost of almonds. Chocolate fillings containing either marzipan or cheaper substitutes based on other comminuted drupes such as peach stones or soyabean meal, promote bloom in the couverture, due to the incompatibility of the couverture glycerides with those in the marzipan or substitute.

The present invention provides a marzipan substitute composition, the glyceride content of which comprises an edible vegetable fat having dilatations at 20° and 35° C. of at least 800 and at most 500 which is compatible with couverture fats to minimise blooming.

The compositions of the invention containing sugar and comminuted drupe or meal in addition to the fat may be provided in the characteristic plastic consistency for use in fillings and general confectionery purposes, or in the form of a free-flowing powder requiring only the addition of water or other aqueous additive.

Meal is the edible part of any grain or pulse, ground to a powder and is the finer part as distinct from the bran or coarser part. Preferably soyabean meal is used, particularly containing at least 60% protein and previously heated to eliminate enzyme and bacterial action. Drupes are not nuts but fruit, e.g. almond, peach and coconut.

Preferably at least 3% to 30% each of fat and meal are present, especially roughly equal amounts, the residue in the free-flowing compositions being sugar of which preferably at least 40% but not more than 90% is present. The sugar may be in powdered and/or crystalised form according to the consistency required in the final product.

The fat preferably exhibits a dilatation at 35° C. of no more than 400, especially a maximum of about 200. At 20° C. its dilatation is preferably at least 1000. It should be compatible with couverture fats and for this reason it should preferably consist, like most couverture fats themselves, predominantly of $C_{16}$–$C_{18}$ triglycerides. Indeed the fat is more preferably itself a couverture fat of which suitable Examples are given in British Pat. Nos. 827,172, 859,769 and 1,521,884. Of course, where the marzipan substitute of the invention is intended as the filling mass for a chocolate consisting of a predominantly lauric couverture then the fat in the composition should itself consist of a lauric fat, i.e. babassu, coconut or palm kernel oil. Hard butters including hardened or fractionated vegetable oils may be used.

The compositions of the invention may be in the form of a plastic mass ready for use, or a powdered mixture to which water, milk or sugar syrup including corn and potato starch syrups, may be added, preferably form 5 to 30%, in an amount according to the consistency required in the plastic product. They may be used alone or in admixture with conventional marzipan or almond pastes. The plastic composition may be used as a coating or to ornament cakes, pastries and other confectionery.

EXAMPLE

A free-flowing powder was obtained by mixing 74% crystal sugar with 13.8% fat and 12% soya meal containing 65% protein. A little sorbic acid as antioxidant and almond flavour were added. Two samples were prepared containing 13.8% couverture fat, one of $D_{20}$ 1450 and $D_{35}$ 400 comprising a blend of hardened vegetable oils having a melting point of 38° C. and Iodine Value 55, made in accordance with patent Case A.159/162 and the other of $D_{20}$ 1900 and $D_{35}$ 125 comprising a blend of palm midfraction and shea stearine in accordance with Example 7 of British Patent Specification No. 925,805.

Each sample was made up to a plastic consistency with the addition of 5 mls of water and 10 gms of sugar syrup per 100 gms of sample and enrobed in the form of bars, with a cocoabutter milk chocolate coating containing in one case a cocoabutter extender fat. In another Example the couverture was based on the same fat as the filling.

These bars showed no blooming after four months' storage during which the temperature was alternated at daily intervals from 12° C. to 25° C. Similar bars containing only half the quantity of fat and soya meal, supplemented with 12.4% crushed almonds, were as successful, but comparative Examples omitting only the added fat showed clear blooming phenomena after only two months' storage under these conditions.

All parts and percentages in this specification are by weight.

What is claimed is:

1. In an edible marzipan substitute plastic candy filling comprising a mixture of ground almonds and sugar wherein at least a portion of said almond constituent thereof is replaced by a replacement substituent, the improvement comprising:

the addition to said mixture of a vegetable fat wherein:

a. said fat is present in said mixture in an amount sufficient to promote bloom-resistance in couvetures applied thereto;

b. said fat has dilatations at 20° C. and 35° C. of at least 800 and at most 500 respectively; and c. said fat is compatible with couvetures applied to said mixture;

the improvement providing an edible marzipan type plastic candy filling having improved bloom-resistance to couvetures applied thereto.

2. Composition according to claim 1 in which the said dilatations are at least 1000 and no more than 400.

3. Composition according to claim 1 in which the dilatation of the fat at 35° C. is no more than about 200.

4. Composition according to claim 1 in which the fat comprises a hard butter.

5. Composition according to claim 1 in which the fat comprises a couverture fat.

6. Composition according to claim 1 in which the substituent contains soyabean meal.

7. Composition according to claim 1 in which the meal contains at least 60% protein.

8. Free-flowing composition which, with the addition of water, is convertible to a plastic filling mass as claimed in claim 1 and comprising 3 to 30% each of soyabean meal and the said fat, balance sugar.

9. Composition according to claim 1 which contains substantially equal parts of said fat and meal.

* * * * *